United States Patent [19]

Hughes et al.

[11] Patent Number: 4,808,205

[45] Date of Patent: Feb. 28, 1989

[54] LID CONSTRUCTION FOR A HEATING VESSEL AND METHOD OF USE

[75] Inventors: Gary N. Hughes, Pittsburgh; George A. Pecoraro, Lower Burrell, both of Pa.

[73] Assignee: PPG Industries, Inc., Pittsburgh, Pa.

[21] Appl. No.: 121,424

[22] Filed: Nov. 16, 1987

[51] Int. Cl.⁴ .............................................. C03B 5/42
[52] U.S. Cl. ........................................ 65/135; 65/335; 65/347; 65/374.12; 110/180; 432/237; 432/250
[58] Field of Search ................... 65/135, 374.12, 335, 65/347; 110/180; 432/250, 237

[56] References Cited

U.S. PATENT DOCUMENTS

| | | | |
|---|---|---|---|
| 2,559,763 | 7/1951 | Ginder et al. | 432/250 X |
| 3,214,154 | 10/1965 | Olsson | 432/250 X |
| 3,765,858 | 10/1973 | Settino | 65/101 |
| 4,162,891 | 7/1979 | Fellnor et al. | 432/250 X |
| 4,182,610 | 1/1980 | Mizuno et al. | 432/237 |
| 4,197,422 | 4/1980 | Fuchs et al. | 13/32 |
| 4,216,348 | 8/1980 | Greenberger | 13/32 |
| 4,381,934 | 5/1983 | Kunkle et al. | 65/135 |
| 4,453,253 | 6/1984 | Lauria et al. | 373/74 |
| 4,496,387 | 1/1985 | Heithoff et al. | 65/335 |
| 4,668,272 | 5/1987 | Newcamp et al. | 65/335 |

Primary Examiner—Arthur Kellogg
Attorney, Agent, or Firm—Andrew C. Siminerio

[57] ABSTRACT

A multilayered, cooled metal lid for a heating vessel has a main support plate fabricated from low carbon steel and a chromium steel overlay that is exposed to the hot interior portions of the vessel. The chromium steel overlay has a chromium content by weight of approximately 10 to 25 percent.

37 Claims, 3 Drawing Sheets

LID CONSTRUCTION FOR A HEATING VESSEL AND METHOD OF USE

BACKGROUND OF THE INVENTION

1. Field of the Invention

This invention relates to high temperature heating vessels, and in particular, to a heat and wear resistant lid for a glass melting furnace.

2a. Technical Considerations

One type of glass melting process entails depositing pulverulent batch material into a pool of molten glass maintained within a tank-type melting furnace and applying thermal energy until the materials are melted into the pool of molten glass. The melting furnace conventionally contains a relatively large volume of molten glass so as to provide sufficient residence time for currents in the molten glass to effect some degree of homogenization before the glass is discharged to a forming operation. These recirculating flows in a tank-type melter may result in inefficient use of thermal energy. Conventional overhead radiant heating is inefficient in that only a portion of its radiant energy is directed towards the material to be melted.

As an alternative to conventional tank-type glass melting furnaces, as described above, U.S. Pat. No. 4,381,934 to Kunkle and Matesa discloses an intensified batch liquefaction process in which large volumes of batch are efficiently liquified in a relatively small liquefaction vessel. This type of process, particularly when using intensified heat sources, produces relatively small volumes of high temperature exhaust gas. The heat from this exhaust gas may be recovered and used to directly heat a batch stream of materials feeding the liquefaction vessel so as to improve the overall efficiency of the process.

In a glass batch melting process as taught in U.S. Pat. No. 4,381,934, the heating process may cause portions of the batch material being heated to vaporize. These vapors are corrosive and combine with the high temperature exhaust gas from heating burners that circulates throughout the vessel to form a high temperature, corrosive gas. In addition, particulate matter from the batch material may become entrained in the exhaust gas stream. These entrained particulates have an abrasive action which, when combined with the high temperature, corrosive gas stream will corrode and erode unprotected, exposed surfaces within the heating vessel.

Due to the corrosive effects of the exhaust gas stream within the vessel which are accelerated by the high temperatures as well as any abrasive or erosive effects from the entrained particulates, exposed surfaces within the vessel, and in particular the vessel lid, must be designed to withstand these deleterious conditions so as to reduce maintenance and/or replacement of the lid that is necessitated by excessive wear along its inner surface. It would be advantageous to have a wear resistant lid design that could withstand such operating conditions and provide a prolonged operating life.

2b. Patents of Interest

U.S. Pat. No. 3,765,858 to Settino teaches a method of roll forming a ribbon of glass at high temperatures by bringing the glass, while still molten, into contact with a roll faced with an iron-based alloy which includes, among other components, 5.0 to 5.8 percent chromium by weight. The patent discloses other roll configurations wherein the rolls are provided with a surface of AISI type 410 or 420 stainless steel.

U.S. Pat. No. 4,216,348 to Greenberger teaches a water cooled roof panel assembly for an electric arc furnace. Copper sheets are brazed to a steel backing having integral ducts to circulate cooling fluid through the panel. An outer ring around the roof assembly acts as both a water source and drain for the panels.

U.S. Pat. Nos. 4,182,610 to Mizuno et al. and 4,197,422 to Fuchs et al. teach a water cooled furnace cover having a plurality of cooling boxes or jackets that provide a ducting arrangement such that coolant may circulate through the cooling boxes to cool the furnace cover. In Mizuno et al., fin-like members extend from the lower surface of the furnace cover so that a slag layer may adhere to the fins to form a heat insulating layer. In Fuchs et al., a protective layer of refractory material is disposed on the underside of the cooling boxes to provide additional thermal protection for the cover.

U.S. Pat. No. 4,453,253 to Lauria et al. teaches a wall and roof construction for electric arc furnaces that are made of graphite blocks with removably attached fluid cooled panels. The panels contain conduits for circulating a cooling fluid along the exterior surface of the block to cool it.

SUMMARY OF THE INVENTION

The present invention provides a heat and wear resistant lid for a heating vessel whose interior surface is subjected to high temperature, corrosive and abrasive conditions during the heating operation. A main support plate constructed from for example, low carbon steel, is covered with a protective facing member to increase the useful operating life of the lid. The lid may be cooled so as to further reduce the deleterious accelerating affect the high temperatures have on the corrosion of the lid.

In one particular embodiment of the invention, the protective member is constructed from a chromium containing alloy that is approximately 10 to 25 percent chromium by weight. The protective member may be a chromium steel alloy plate or weld overlay. The lid is cooled to maintain a member temperature between approximately 900° F. to 1200° F. (482° C. to 649° C.) so that entrained materials within the circulating exhaust gas adhere to and build up on the exposed surface of the member and form an insulating and protective layer. Chromium alloy steel is used for the protective member because of its high temperature and abrasive resistant characteristics as well as its resistance to oxidization and sulfidation.

The present invention also provides a lid module for a heating unit having a rigid support plate, a protective facing member overlaying the support plate and an arrangement to independently support each module, interconnect the module with adjacent modules, and cool each module. The protective member is a chromium containing alloy and may include a plurality of overlaying members.

The present invention further provides a method of protecting an exposed, inner surface of a heating vessel from corrosive gases. The exposed surface as provided with a protective member whose temperature is maintained outside a range of a temperature range within which it will crack.

DETAILED DESCRIPTION OF THE INVENTION

This invention is used in a process wherein a hostile environment deteriorates a lid of a container and is particularly well suited for use in a heating process where high temperatures, in addition to other adverse conditions within a heating vessel, such as circulation of corrosive and abrasive materials, significantly reduce the usefully life of the lid in the heating vessel. The invention is presented in connection with glass batch liquefaction process equipment similar to the type taught in U.S. Pat. No. 4,496,387 to Heithoff, whose teachings are hereby incorporated by reference, but as will be appreciated, the invention can be used in any heat related process in which an unprotected, exposed structure is employed.

Figure 1:
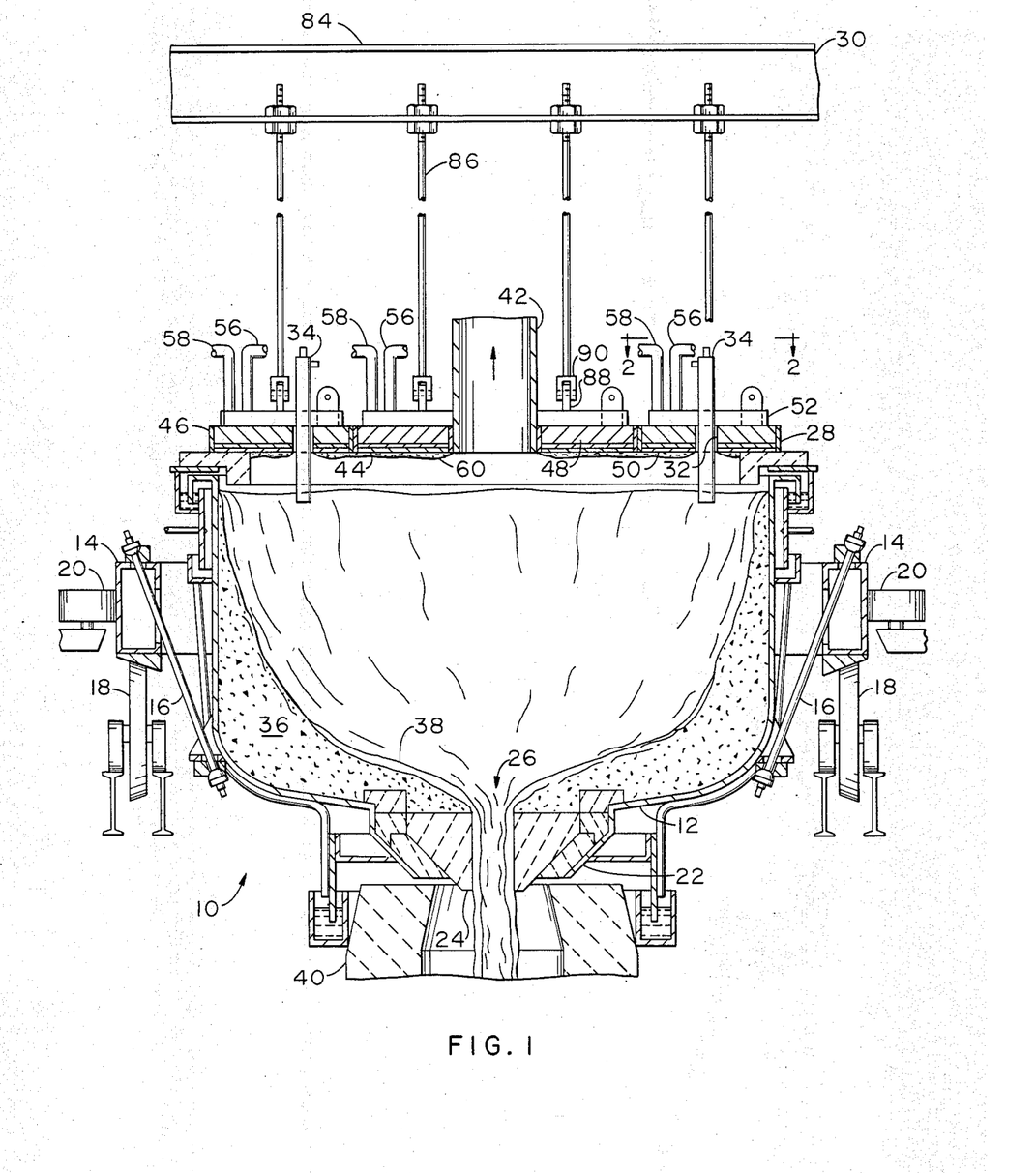
FIG. 1 is a cross-section of a heating vessel with a lid having the features of the present invention.

In a melting process, material is deposited in a vessel which, in the preferred embodiment, is adapted to apply intense heat to the material in a relatively small space. The material is rapidly converted to a liquefied state which thereafter flows out of the vessel. FIG. 1 illustrates a liquefaction vessel 10 similar to the type disclosed in U.S. Pat. No. 4,668,272 to Newcamp et al. whose teachings are hereby incorporated by reference. A steel drum 12 is suspended from a circular frame 14 by struts 16, which is mounted on a plurality of support rollers 18 and aligning rollers 20, for rotation about a generally vertically axis corresponding to the center line of the drum 12. An outlet 22 below the drum 12 includes a bushing 24 with an open center 26. Lid 28, which is the subject of this invention, is provided with a stationary support by way of a frame 30 which is mounted independently from and above the rotating drum 12 as shown in FIG. 1. The lid 28 includes one or more openings 32 for inserting a high temperature burner 34 into the vessel 10.

Within the liquefaction vessel 10, a stable layer of unmelted batch 36 is maintained on the walls of the drum 12 and encircling the central cavity within which combustion and melting takes place. The heat from the burners causes a surface portion 38 of the batch to become liquefied and flow downwardly toward and through the bottom opening 26. The liquefied batch then flows out of the liquefaction vessel 10 and may be collected in a vessel 40 below the liquefaction vessel 10 for further processing as needed, for example as shown in U.S. Pat. No. 4,381,934 to Kunkle et al., whose teachings are hereby incorporated by reference. Exhaust gases escape either upwardly through an opening in the lid 28 and into an exhaust outlet 42 or downwardly through the bottom opening 26 at the bushing 24.

During the melting process in the liquefaction vessel 10, various materials become entrained in the hot exhaust gas stream. For example, in a typical soda-lime-silica glass batch, these entrained materials may include vapors such as, but not limited to, sodium oxide and particulates such as, but not limited to, sodium sulfate or sodium carbonate, all of which are highly corrosive. The vapors and particulates combine with the hot exhaust gas to form a corrosive and abrasive gas stream that will corrode inner surface 44 of the lid 28 that is exposed to the gas. In particular, the inner surface 44 is subjected to oxidation and sulfidation in the high temperature environment. The high temperature within the liquefaction vessel 10, which typically is in the range between approximately 2400° F. to 2600° F. (1316° C. to 1427° C.) near the lid surface 44, accelerates this corrosion and wear. In addition, particulates entrained in the gas stream may further erode the surface 44. It has been observed that this mechanical and chemical attack may wear alumina/zirconia/silica refractory at a rate in excess of one quarter inch (0.64 cm) per 24 hour elapsed time period.

One method of reducing the wearing action of the exhaust gas on exposed portions of vessel 10, and in particular on lid 28, is to direct a high velocity gas from a gas jet between the exhaust gas and the exposed portion as taught in U.S. Pat. No. 4,675,041 to Tsai, which teachings are hereby incorporated by reference. The high velocity gas minimizes contact between the exhaust gas and the exposed portions of the vessel so as to reduce wear due to corrosive degradation.

Figure 2:
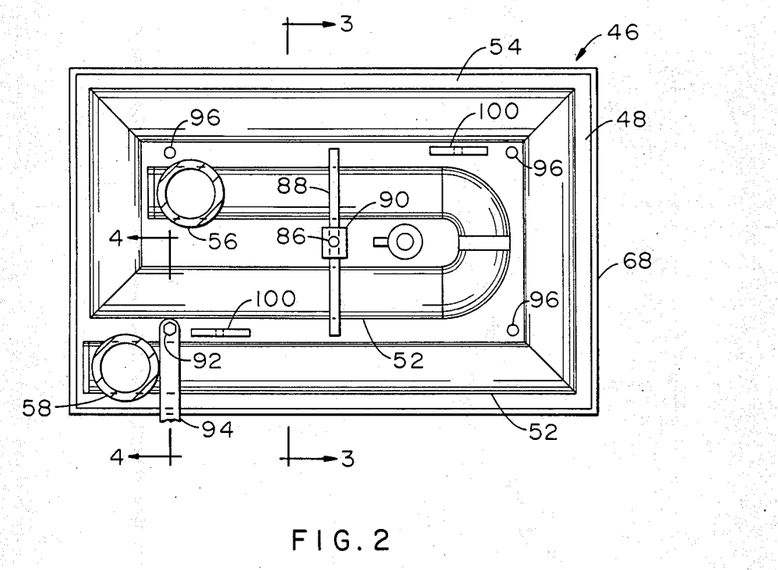
FIG. 2 is an enlarged top view of a lid module for the heating vessel lid illustrated in FIG. 1 with portions removed for clarity.
Figure 3:
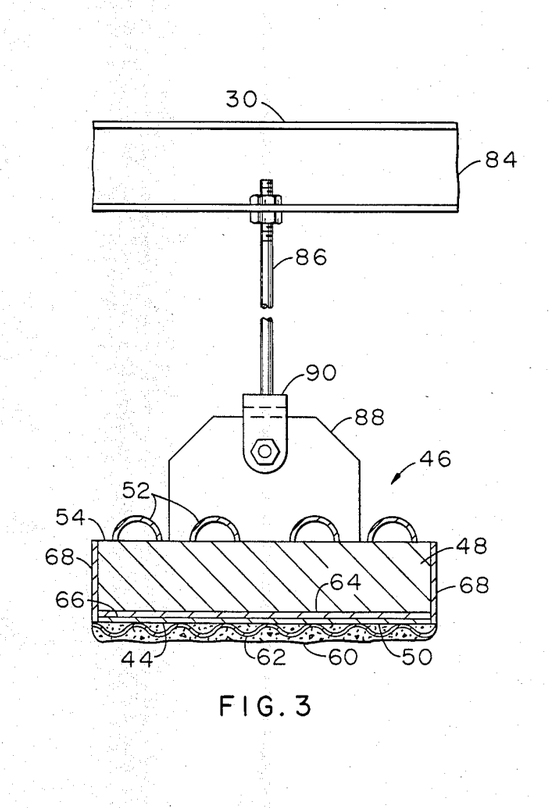
FIG. 3 is a cross-sectional view through line 3—3 of FIG. 2 illustrating the protective facing members, the batch build-up layer, the expanded metal anchors, the cooling ducts and hanger support arrangement.
Figure 4:
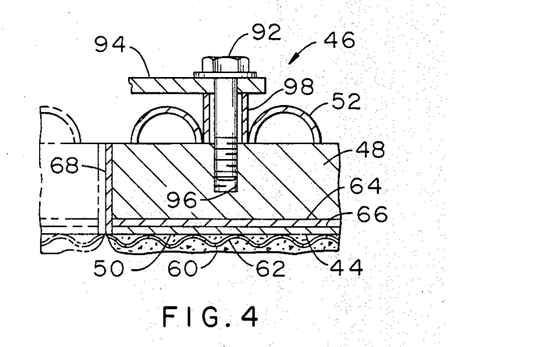
FIG. 4 is a cross-sectional view through line 4—4 of FIG. 2 illustrating the lid module interconnecting arrangement with portions removed for clarity.

The present invention teaches another way to protect the exposed portions of the vessel from the circulating exhaust gas. Referring to FIGS. 2 through 4, the lid 28 of the present invention is constructed from a plurality of lid modules 46 each including a main base plate 48 and a high temperature, wear resistant overlayment 50 on the hot face 44 of the lid 28. The term "wear resistant" as used herein includes, but is not limited to, resistance to corrosion, abrasion, oxidation or any other surface depletion mechanism that will reduce the effective operating life of the lid 28. The overlayment 50 is preferably a plate or a weld overlay as will be discussed later. Although not limited in the present invention, in the preferred embodiment of the invention, the overlayment 50 is a chromium alloy stainless steel. The surface of a chromium alloy steel will oxidize leaving a chromium oxide layer that protects and seals the underlying steel against further oxidation and chemical attack. Chromium alloy steels are also abrasion resistant.

In the area of glass melting, ferritic stainless steel is preferred over austenitic stainless steel because the former has little or no nickel. If nickel from the lid 28 gets into the melted glass, it will form a nickel sulfide stone defect in the final glass ribbon. In the following discussion reference to the properties of chromium steel will be to ferritic steel but it should be appreciated that similar problems may occur with austenitic stainless steels.

Generally, the higher the chromium content in the steel the greater its oxidation and corrosive resistance, but the use of chromium steels present addition problems. For example, chromium steels containing more than about 15% chromium by weight and exposed to sustained temperatures in the range of about 750° F. to 1050° F. (399° C. to 566° C.) may increase in hardness with a corresponding decrease in ductility. This embrittlement increases with increasing chromium and time at temperature. As a result, even though a lid surface 44 exposed directly to an intense heat of greater than 1000° F. (538° C.) is constructed of chromium steel with a high content of chromium, if the temperature gradient through the overlay thickness is such that portions of the overlay are maintained within a critical predetermined temperature range, the lid 28 may develop internal cracking.

To prolong the useful life of the lid 28, the temperature of the lid 28, and more particularly, the overlayment 50, is controlled to avoid embrittlement. In the particular embodiment of the invention illustrated in FIGS. 2 through 4, each module 46 of the lid 28 is cooled by circulating coolant, preferably water, through a series of ducts 52 formed, for example, by pipe members divided along their longitudinal axis and welded to the cold face 54 of the base plate 48. This cooling arrangement is easily fabricated and avoids the need to form base plate 48 with integral ducts. Individual inlets 56 and outlets 58 allow the amount of coolant circulating through the ducts 52 to be varied so as to provide individual temperature control of each module 46 of the lid 28, if required. In addition, the inlets 56 and outlets 58 allow a single module 46 to be removed from the lid 28, as will be discussed later, without affecting the coolant circulation to the other modules 46.

The useful life of the lid 28 may be prolonged further by providing a protective cover for overlayment 50. In the preferred embodiment of the invention, the lid 28 is cooled to a temperature such that material circulated by the hot exhaust gas within the vessel 10 will begin to adhere to it in a manner similar to that taught in U.S. Ser. No. 68,375 to Kunkle et al. filed June 27, 1987, which teachings are hereby incorporated by reference. In the initial stages of the vessel 10 heatup, the exhaust gas with the vessel 10 may include, but is not limited to, entrained airborne particulates such as sand grains, dolomite and limestone, molten sodium carbonate, and molten glass cullet particles. At a sufficiently low hot face 44 temperature, material such as molten glass cullet and sodium carbonate will condense and "freeze" on the hot face 44 with additional glass cullet and sodium carbonate, as well other solid particulate materials and condensed vapors, building up thereon. This built-up layer 60 has a coefficient of thermal conductivity at least an order of magnitude lower than the metal lid 28 and therefore provides an insulating effect so that more heat stays within the vessel 10 and less is removed through the lid 28. As the temperature within the vessel 10 increases due to less heat loss, additional particulates within the exhaust gas stream begin to soften and also stick to the previously deposited batch layer 60 further increasing its insulating qualities. This in turn further reduces the heat loss through the lid 28 and increases the temperature within the vessel 10. In addition, unsoftened particulates are captured by the heat softened layer, further adding to its thickness and insulative properties. At a sufficiently high temperature within the vessel 10, the deposited material in layer 60 will start to melt at the surface exposed to the interior of the vessel 10 and drip back into the vessel 10, thus limiting the thickness of the batch layer 60 build-up and maintaining it at a generally constant layer thickness, with a correspondingly reduced heat loss. At this steady state condition, the final batch layer 60 thickness will directly relate to the types of material being heated and the interior temperature within the vessel 10.

The batch layer 60 provides several interrelated functions. The layer 60 protects the surface against abrasive particles circulating within the vessel. It is contemplated that some of the particulates will get "stuck" to the layer and become part of the layer 60 itself. The layer 60 further functions as an insulator that both reduces the heat loss within the heating vessel 10 through the lid 28, and lowers the temperature of the hot face 44, thus reducing the effects of heat degradation. The layer 60 also seals the face 44 and protects it from chemical attack. Specifically, the layer 60 provides a barrier between the face 44 of the lid 28 and oxygen, moisture, and corrosive vaporous gases that circulate within the vessel 10, all of which will attack and corrode the lid hot face 44. Since chemical reactions are generally accelerated at high temperatures, the reduced temperature of the hot face 44 of the lid 28, due to the insulating layer 60, reduces the rate of any chemical attack at the face 44 by corrosive materials and thus prolongs the lid life. However, it should be noted that the batch layer 60 itself is corrosive due to, for example, the sulfur content in the layer 60 which results in sulfidation attack, so that the hot face 44 of the lid 28 must still be resistant to chemical attack.

As the layer 60 increases in thickness, it is possible that a portion of the layer 60 may fall off exposing an area of the hot face 44 of the lid 28. As a result, there may be a temporary loss of insulating effect requiring sudden change in heating and cooling demands. This may lead to difficulty in controlling internal vessel temperature and the amount of coolant required for the lid 28. If desired, the hot face 44 of the lid may include anchoring devices such as, but not limited to, foraminous members 62, such as expanded metal, perforated plates, or screening secured to face 44 of the lid 28 to hold the layer 60, as shown in FIGS. 1, 3 and 4. The foraminous members 62 must be heat resistant and adequately attached to the lid 28 for sufficient cooling and to help support the layer 60 as it builds on the hot face 44.

In the particular embodiment of the invention illustrated in FIGS. 2 through 4, the lid 28 is fabricated from a 1½ inch (3.81 cm) thick base plate 48 of low carbon steel, for example AISI 1010 steel, a ¼ inch (0.64 cm) thick intermediate plate 64 of chrome steel having approximately 10 to 16 percent chromium content by weight and a ¼ inch to ⅜ inch (0.64 to 0.95 cm) exposed inner plate 66 of chrome steel with approximately 16 to 27 percent chromium content by weight. The preferred coolant is water which is circulated through the ducts 52 to maintain the lid surface 44 at temperature between 900° F. to 1200° F. (482° C. to 649° C.). If required, chromium steel side plates 68 may be added to protect the side faces of the base plate 48, as illustrated in FIGS. 2 through 4. No. 16 expanded metal mesh fabricated from 410 stainless steel is tack welded at approximately 2 to 3 inch centers (5.08 cm to 7.62 cm) to plate 66 of the lid 28.

As discussed above, if the plate 66 is too thick, a portion of the plate may be cooled by a combination of the water cooling and/or the layer 60 build-up, to a temperature range within which cracking may occur due to the temperature gradient through the plate thickness. For example, if the plate 66 is constructed from chromium steel that is 25 percent by weight chromium and the plate 66 is cooled so that the temperature gradient from the surface 44 through the plate 66 results in a portion of the plate thickness being maintained at a temperature within its embrittlement range, there is a possibility that internal cracking may occur in the inner plate 66. By including an intermediate plate 64 of chromium steel that has a lower chromium content than the exposed inner plate 66, and establishing the thicknesses of plates 64 and 66 so that under a predetermined set of operating parameters, the temperature gradient through the overlayment 50 is such that the entire thickness of plate 66 is maintained above the embrittlement temperature range of 25% chromium content chromium steel, the plate 66 will not crack due to embrittlement. The lower chromium content steel can be maintained within the temperature range of the temperature gradient that will cause embrittlement of the 25% chromium content steel because, due to its lower chromium content, the embrittlement temperature range is lower. As a result, the intermediate plate 64 will not experience the same adverse affects within the embrittlement temperature range of the 25% chromium content steel so that the risk of embrittlement in either plate of the overlayment 50 is reduced.

It should be appreciated that a single plate of chromium steel having an embrittlement temperature range outside the temperature range of the temperature gradient through the overlayment 50 may be used so as to eliminate cracking due to embrittlement. A low chromium content chromium steel may have an embrittlement temperature range below the temperature gradient temperature range so that cracking due to embrittlement will not occur, but low chromium content chrome steel is less wear resistant than higher chromium content steels. On the other hand, a high chromium content chrome steel with an embrittlement range range above the temperature gradient temperature range, may provide adequate wear resistance but is more expensive than lower chromium content chrome steel.

As an alternative, the overlayment 50 on the hot face 44 may be constructed from multiple layers of the same chromium content chrome steel. With this arrangement, using high chromium content steel, the steel plates positioned between the main plate 48 and exposed outermost chromium steel plate may crack without the crack propagating through the overlayment 50 to the hot face 44 of lid 28. If lower chromium content steel is used, the exposed outermost plate may crack but the interior plates will not, so that the main plate 48 is protected.

The plates 64 and 66 may be secured to the main plate 48 in a number of ways well known in the art, such as conventional welding, explosion welding and roll bonding. It should be noted that the integrity of a conventionally welded system is limited by the defects that are inherent in the welding process, for example microcracking, voids, etc. In addition, conventional welding may not provide the degree of heat transfer between metal plates as is required in a high temperature operation. For the high temperature applications, explosion welding is the preferred method since it provides the continuous, intimate contact between plates that is necessary for good thermal conductivity through the lid. If explosion welding is used for fabrication, care must be taken to be sure that the impact strength of the plate materials is high enough to withstand the explosion welding techniques.

It should be appreciated that although in the preferred embodiment of this invention, the overlayment 50 is chromium steel, other alloys may be used, e.g., Alpha IV which is an aluminum and chromium alloy available from Allegheny Ludlum Corp., Pennsylvania, and Stellite 6 which is a cobalt and chromium alloy available from Cabot Stellite Division, Indiana.

As an alternative, the overlayment 50 may be a weld overlay, i.e., a series of weld beads deposited side by side covering the entire hot face 44 of the lid 28. In the particular embodiment of the invention illustrated in FIGS. 5 and 6, chromium steel weld beads 70 are applied to the base plate 48 by any of a number of well known welding techniques, such as submerged arc welding, which is preferred, and metal insert gas weldings. The weld area 72 is preferably kept small to reduce distortion of the base plate 48 which may warp or bow if long weld beads 70 are used. After one layer 74 of weld overlay is applied, subsequent weld overlay layers 76 may be added, with the additional layers having a different chromium content if required, to avoid embrittlement as already discussed.

A weld overlay provides the intimate bond with the base plate 48 that is required for good thermal conductivity between base plate 48 and layer 74, but welding presents additional concerns that must be addressed. When a chromium alloy bead is applied to base plate 48, the two metals combine and the chromium content in the resulting bead is diluted, i.e., the chromium content will be approximately the average chromium content of the base material and the overlay material. For example, if the base material has no chromium and the weld overlay material is 20% chromium by weight, the resultant bead will be approximately 10% chromium i.e., (0% chromium in base plate+20% chromium is overlay material)/2. It should be noted that successive passes of chromium overlayment material to build up the overlayment 50 thickness will result in less dilution since the underlying material will contain chromium. Continuing with the previous example, if a second layer of the same weld overlay material is added over the first layer, the resulting chromium content in the second layer will be approximately 15%, i.e., (10% in first layer+20% in second layer)/2. It is obvious that the greater the number of weld passes, the less the chromium content reduction and thus the higher the resulting chromium content.

In addition, the type of base plate 48 material may influence the effectiveness of the weld overlay. It has been found that when the carbon content of the base plate 48 is too high, for example, as in cast iron, the chromium in the overlay material combines with the carbon to form chromium carbide. This combination reduces or eliminates the chromium available to form the chromium oxide protective layer as discussed earlier. To avoid this situation, low carbon and/or low carbon chromium steel base plate materials should be used. As an alternative, if the base plate carbon content is too high, a weld overlay layer of low carbon content material, such as pure iron, may be positioned between the bsae plate 48 and the chromium alloy steel weld overlay to act as a buffer and reduce chromium depletion from the weld overlay.

Figure 5:
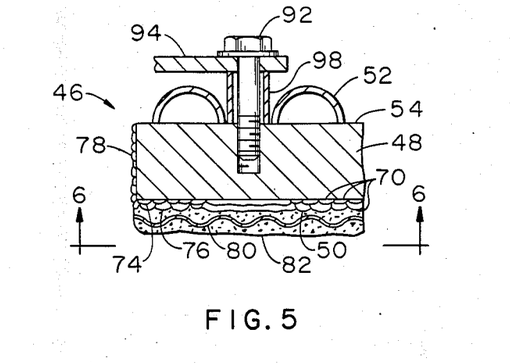
FIG. 5 is a view similar to FIG. 4 illustrating an alternate embodiment of the invention.
Figure 6:
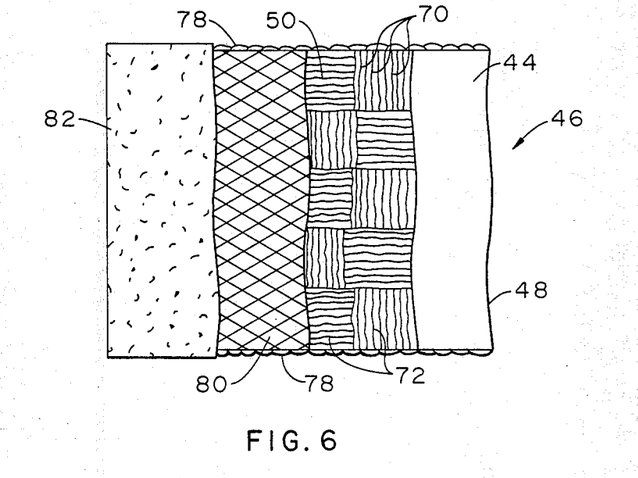
FIG. 6 is a view along line 6—6 of FIG. 5 showing the exposed surface of the lid of the heating vessel illustrated in FIG. 1.

In the particular embodiment shown in FIGS. 5 and 6, ⅛ inch (0.32 cm) thick beads 70 of 25% chromium content alloy steel are applied in approximately 6 inch by 6 inch (15.24 cm by 15.24 cm) weld areas 72 to cover a 2½ inch (6.35 cm) thick low carbon steel base plate 48. Two ⅛ inch (0.32 cm) thick layers of weld overlay 78 protects the sides of the base plate 48. Stainless steel expanded metal 80 may be use to cover the hot face 44 and support the batch layer 82 which may be formed as discussed earlier.

The thickness of the base plate 48 and overlayment 50 and the cooling arrangement in any embodiment of the present invention are all interrelated and depend on the operating conditions of the vessel 10. The temperature at the hot face 44 of the lid 28 depends on the temperature within the vessel 10 and the amount of cooling in the lid 28. Cooling, in turn, depends on the thickness of the base plate 48 and overlayment 50 and their respective coefficients of the thermal conductivity and the spacing of the cooling ducts 52 on the cold face 54 of base plate 48, as well as the desired temperature at hot face 44. Also, as discussed earlier, embrittlement of the chromium overlayment 50 will determine layer thickness.

In the preferred embodiment of this invention, each individual module 46 is supported such that it may be removed without affecting the operation of the remaining modules 46 in a manner similar to that disclosed in allowed U.S. Ser. No. 873,003 to Matesa et al., filed June 11, 1986, which teachings are hereby incorporated by reference. In the particular embodiment of the invention illustrated in FIGS. 1 and 3, modules 46 are supported from beam 84 of support frame 30 via tie rod 86 and hanger 88. Clevis member 90 of tie rod 86 is pinned to hanger 88 while the upper end of rod 86 is removably secured to beam 84.

Each module 46 is preferably interconnected in any convenient fashion with adjacent modules to form a unitary lid structure. In the particular embodiment of the invention illustrated in FIG. 4, bolt 92 extends through opposing ends of tie plate 94 and into bolt hole 96 of main plate 48. Collars 98 maintain tie plate 94 is spaced relation from main plate 48.

Positioning plates 100, similar in construction to hangar 88, may be provided for handling the module 46 as it is moved into and out of position in the lid 28 by a lifting mechanism, e.g., overhead hoist (not shown). The hoist may lower an assembly (not shown) to connect to positioning plates 100. The hoist cable is then tensioned so as to support the module 46 as the tie rod 86 and tie plates 94 are disconnected and the inlet 56 and outlet 58 are uncoupled from the coolant supply (not shown). The hoist then lifts the lid module 46 out from the lid 28, transfers it to an unloading site and returns to the opening in the lid 28 with a new lid module 46. As an alternative, the modules 46 may be lifted directly be the tie rod 86.

It should be appreciated that although the embodiments of the invention disclosed in FIG. 1 through 6 illustrate a flat lid with rectangular removable modules, other lid and/or module configurations may be used. For example, the lid 28 may be domed and/or the modules 46 may be wedge shaped as taught in allowed U.S. Ser. No. 873,003.

The modular construction of lid 28 allows the use of modules with different thickness of overlayment 50 at different locations. For example, the overlayment 50 for modules 46 at potential problem areas, such as in the vicinity of a material loading chute (not shown) or an exhaust outlet 42, may be thicker than other lid portions.

In addition, the lid design of the present invention may be combined with other lid or roof configurations wherein only selected portions of the roof require continual monitoring and replacement due to temperature and/or corrosive and/or abrasive conditions within the heating vessel. For example, a roof may be a continuous, one piece structure over a majority of the vessel with replaceable modules 46 at potential problem areas.

The forms of this invention shown and described in this disclosure represent illustrative embodiment and it is understood that various changes may be made without the departing from the scope of the invention.

I claim:

1. A multilayer lid for a glass melting vessel comprising:
   a rigid base plate member; and
   a heating resistant member covering a portion of the lower major surface of said plate member and exposed to the interior of said vessel, wherein said member is an alloy including a major constituent selected from a group consisting of iron or cobalt or a combination of iron and cobalt, a minor constituent of chromium and is essentially nickel free.

2. The lid as in claim 1 wherein said alloy is chromium steel approximately 10 to 27 percent chromium by weight.

3. The lid as in claim 2 wherein said heat resistant member includes a plurality of heat resistant members in overlaying relation to each other.

4. The lid as in claim 3 wherein said heat resistant members are chromium steel plates.

5. The lid as in claim 3 wherein said heat resistant members are chromium steel weld overlays.

6. The lid as in claim 3 further including means to cool said lid.

7. The lid as in claim 6 wherein said support plate includes a plurality of support plates each having heat resistant members overlaying to at least a portion of the lower surface of each of said support plates and further including means to independently support selected support plates in spaced relation above said vessel in a manner such that said selected support plates are vertically movable relative to the other support plates so as to allow removal and replacement of said selected support plates.

8. A lid for a glass batch material melting apparatus including a heating vessel and means for heating said material within said vessel wherein portions of said material are entrained in exhaust gas from said heating means and further wherein portions of said material vaporize and combine with said exhaust gas so as to produce a high temperature, abrasive and corrosive gas which degrades portions of said lid exposed to said gas as said gas circulates within said vessel, the lid comprising:
   a main support plate with a lower major surface facing the interior of said heating vessel;
   a protective member covering at least a portion of said exposed portions of said support plate wherein said member is an alloy having a major constituent selected from a group consisting of iron or cobalt or a combination of iron and cobalt, a minor constituent of chromium, and is essentially nickel free; and
   means to cool said selected portion of said lid.

9. The lid as in claim 9 wherein said alloy is chromium steel approximately 10 to 27 percent chromium by weight.

10. The lid as in claim 9 wherein said member includes a plurality of chromium steel protective members in overlaying relation to each other.

11. The lid as in claim 10 wherein said protective members are chromium steel plates.

12. The lid as in claim 10 wherein said protective members are chromium steel weld overlays.

13. The lid as in claim 9 wherein said protective member includes a first chromium steel layer having approximately 16 to 27 percent chromium content by weight and a second chromium steel layer having approximately 10 to 16 percent chromium content by weight wherein said first layer overlays and is secured to at least a portion of said second layer and said second layer overlays and is secured to said main support plate.

14. The lid as in claim 13 wherein the thickness of each of said layers is such that the temperature of each of said layers is maintained outside the temperature range within which said layers will crack.

15. The lid as in claim 9 wherein said support plate includes a plurality of support plates each having a protective member overlaying to at least a portion of the lower surface of each of said support plates to form individual lid modules and further including means to independently support selected lid modules in spaced relation above said vessel in a manner such that said selected lid modules are vertically movable relative to the other lid modules so as to allowed removal and replacement of said selected lid modules.

16. The lid as in claim 15 further including means to interconnect said selected lid modules.

17. The lid as in claim 16 wherein said cooling means include means to individually cool each of said selected lid modules.

18. The lid as in claim 17 wherein said protective members are chromium steel plates.

19. The lid as in claim 17 wherein said protective members are chromium steel weld overlays.

20. The lid as in claim 9 wherein said cooling means include means to maintain the lower surface of said lid at a temperature between approximately 900° to 1200° F.

21. The lid as in claim 20 wherein said cooling means includes duct means secured to the upper major surface of said main support plate and means to circulate coolant through said duct means.

22. The lid as in claim 21 further including a protective layer including portions of said particulate material built-up on an exposed surface of said protective member to protect and insulate said lid.

23. The lid as in claim 22 further including means to anchor said layer to said protective member.

24. The lid as in claim 23 wherein said anchor means is expanded metal secured to said protective member.

25. The lid as in claim 24 wherein said protective member thickness is such that the temperature of said member is maintained outside the temperature range within which said protective member will crack.

26. The lid as in claim 25 wherein said protective member is a chromium steel plate.

27. The lid as in claim 25 wherein said protective member is a chromium steel weld overlay.

28. A module for a lid to be mounted over a glass melting unit comprising:
a rigid support plate;
a protective facing member covering the lower surface of said support plate wherein said facing member is an alloy including a major constituent selected from a group consisting of iron or cobalt or a combination of iron and cobalt, a minor constituent of chromium, and is essentially nickel free;
means to independently support said module above said glass melting unit;
means to cool said module; and
means to interconnect said module with adjacent modules.

29. The module as in claim 28 wherein said alloy is chromium steel approximately 10 to 27 percent chromium by weight.

30. The module as in claim 29 wherein protective member includes a plurality of chromium steel members in overlaying relation to each other.

31. The module as in claim 28 wherein said protective member is a chromium steel plate.

32. The module as in claim 28 wherein said protective member is a chromium steel weld overlay.

33. A method of protecting an exposed inner surface of a glass melting vessel wherein heating material within said vessel establishes an exhaust gas circulating pattern within said vessel that moves along said exposed inner surface and said exhaust gas combines with particulate, molten, and vaporized material within said vessel so as to produce a high temperature, abrasive, and corrosive gas comprising:
overlaying said exposed inner surface with a protective facing member having a major constituent selected from a group consisting of iron or cobalt or a combination of iron and cobalt, a minor constituent of chromium, and is essentially nickel free; and
maintaining said temperature of said protective member outside of a temperature range within which said protective member cracks.

34. The method as in claim 33 wherein said maintaining step includes cooling said exposed surface to a temperature such that said particulate and molten material contacting said cooled surface adheres to said surface and forms a protective layer on said surface wherein additional materials in said exhaust gas adhere to previously deposited material so as to increase the thickness of said layer.

35. The method as in claim 34 wherein said maintaining step includes maintaining temperature of said exposed inner surface between approximately 900° to 1200° F.

36. The method as in claim 35 wherein said exposed surface is an exposed surface of a lid of said vessel and further including the step of providing anchors on said exposed lid surface to help secure said layer to said lid surface.

37. The method as in claim 35 wherein said exposed surface is an exposed surface of a lid of said vessel and further including the step of securing heat resistant foraminous members to said lid surface to help secure said layer to said lid surface.

* * * * *

UNITED STATES PATENT AND TRADEMARK OFFICE
CERTIFICATE OF CORRECTION

PATENT NO. : 4,808,205

DATED : February 28, 1989

INVENTOR(S) : Gary N. Hughes and George A. Pecoraro

It is certified that error appears in the above-identified patent and that said Letters Patent is hereby corrected as shown below:

Column 10, line 61
Claim 9, line 1, delete "9" and insert --8--.
Column 11, line 15
Claim 15, line 1, delete "9" and insert --8--.
Column 11, line 35
Claim 20, line 1, delete "9" and insert --8--.

Signed and Sealed this

Twelfth Day of June, 1990

Attest:

HARRY F. MANBECK, JR.

Attesting Officer

Commissioner of Patents and Trademarks